(12) United States Patent
Harada

(10) Patent No.: US 6,211,915 B1
(45) Date of Patent: Apr. 3, 2001

(54) SOLID-STATE IMAGING DEVICE OPERABLE IN WIDE DYNAMIC RANGE

(75) Inventor: Kouichi Harada, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 08/797,448

(22) Filed: Feb. 6, 1997

(30) Foreign Application Priority Data

Feb. 9, 1996 (JP) .................................................. 8-023931

(51) Int. Cl.[7] .......................................................... H04N 3/14
(52) U.S. Cl. ............................................. 348/298; 348/314
(58) Field of Search .................................... 348/297, 298, 348/299, 314, 315, 322, 320

(56) References Cited

U.S. PATENT DOCUMENTS

| | | | |
|---|---|---|---|
| 4,875,098 | * 10/1989 | Yamamoto et al. ................. | 348/250 |
| 5,239,192 | * 8/1993 | Hirota .................................. | 257/239 |
| 5,335,075 | * 8/1994 | Komiya et al. ...................... | 348/298 |
| 5,572,256 | * 11/1996 | Egawa et al. ........................ | 348/296 |

FOREIGN PATENT DOCUMENTS

| | | | |
|---|---|---|---|
| 1-254893 | * 9/1989 | (JP) | ........................................... 5/335 |
| 3-117281 | * 9/1989 | (JP) | ........................................... 5/335 |

* cited by examiner

*Primary Examiner*—Wendy Garber
*Assistant Examiner*—Jacqueline Wilson
(74) *Attorney, Agent, or Firm*—Sonnenschein, Nath & Rosenthal

(57) ABSTRACT

In a CCD solid-state imaging device, a wider dynamic range is available without producing fixed pattern noise. A solid-state imaging device is comprised of: an imaging portion for photoelectrically converting incident light to thereby produce a signal charge of a high sensitivity and a signal charge of a low sensitivity; a horizontal transfer register arranged adjacent to the imaging portion, for transferring the signal charges and having an output gate at a terminal portion thereof, which clips the signal charge of the high sensitivity; a charge detecting portion arranged adjacent to the output gate, for detecting the signal charge transferred from the horizontal transfer register; and a bias applying circuit for applying a bias voltage to the output gate so as to set a clip level for clipping the signal charge of the high sensitivity.

19 Claims, 6 Drawing Sheets

SOLID-STATE IMAGING DEVICE OPERABLE IN WIDE DYNAMIC RANGE

BACKGROUND OF THE INVENTION

The present invention generally relates to a solid-state imaging device, and more specifically, to a so-called "wide dynamic range CCD solid-state imaging device", the dynamic range of which is wide with respect to a light input.

In CCD solid-state imaging devices, light receiving portions (pixels) are arranged in a two-dimensional matrix form, and photoelectrically converts input light into signal charges, and stores the signal charges. After these signal charges are overflown from the light receiving portions, since the signal outputs based on the overflown signal charges become constant, such a signal output can be hardly obtained which corresponds to incident light amounts exceeding the saturation level of the light receiving portions. As a result, dynamic ranges in response to the light inputs would become narrow.

Figure 1:
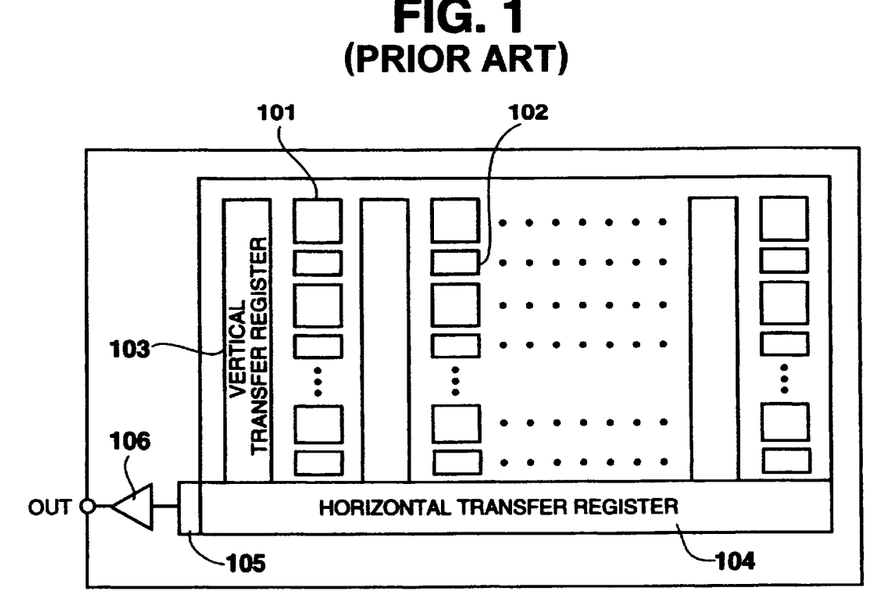
FIG. 1 schematically shows the structure of conventional solid-state imaging device.

To extend, or enlarge this narrow dynamic range, there is one conventional solid-state imaging apparatus described in, for instance, Japanese Laid-open Patent Application No. 3-117281. That is, as shown in FIG. 1, two different sorts of light receiving portions having different sensitivities are alternately arranged adjacent to each other. For instance, the high-sensitive light receiving portion 101 and the low-sensitive light receiving portion 102 are alternately arranged adjacent to each other along the vertical direction. The signal charges of the high-sensitive light receiving portion 101 are limited in the light receiving portion and thereafter the limited signal charges are read out from the vertical transfer register 103. After the signal charges of the high-sensitive light receiving portion 101 are mixed with the signal charges of the low-sensitive light receiving portion 102 in this register 103, the mixed signal charges are vertically transferred. Furthermore, the signal charges are horizontally transferred by the horizontal transfer register 104 to the charge detecting portion 105. The horizontally transferred signal charges are converted into the electric signals in this charge detecting portion 105, and thereafter the electric signals are outputted via the buffer 106.

Figure 2:
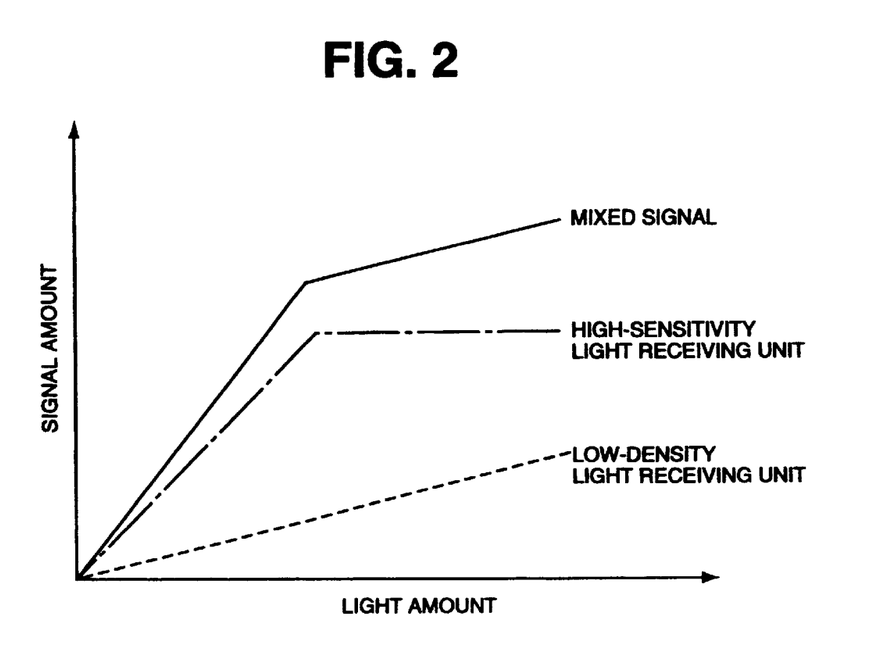
FIG. 2 shows an input/output characteristic diagram approximated to a folded line.

In this CCD solid-state imaging device, when the incident light amount exceeds a predetermined amount, since the limiter is operable to the signal charges of the high-sensitive light receiving portion 101, the signal charges of the high-sensitive light receiving portion 101 are mixed with the signal charges of the low-sensitive light receiving portion 102 to thereby achieve such an input/output characteristic approximated to a bent line shown in FIG. 2. As a result, a wide dynamic range may be realized. It should be noted that in the graphic representation of FIG. 2, a dot and dash line shows the input/output characteristic of the high-sensitive light receiving portion 101, a dotted line indicates the input/output characteristic of the low-sensitive light receiving portion 102, and a solid line represents the input/output characteristic of the mixed signal charges.

Figure 3:
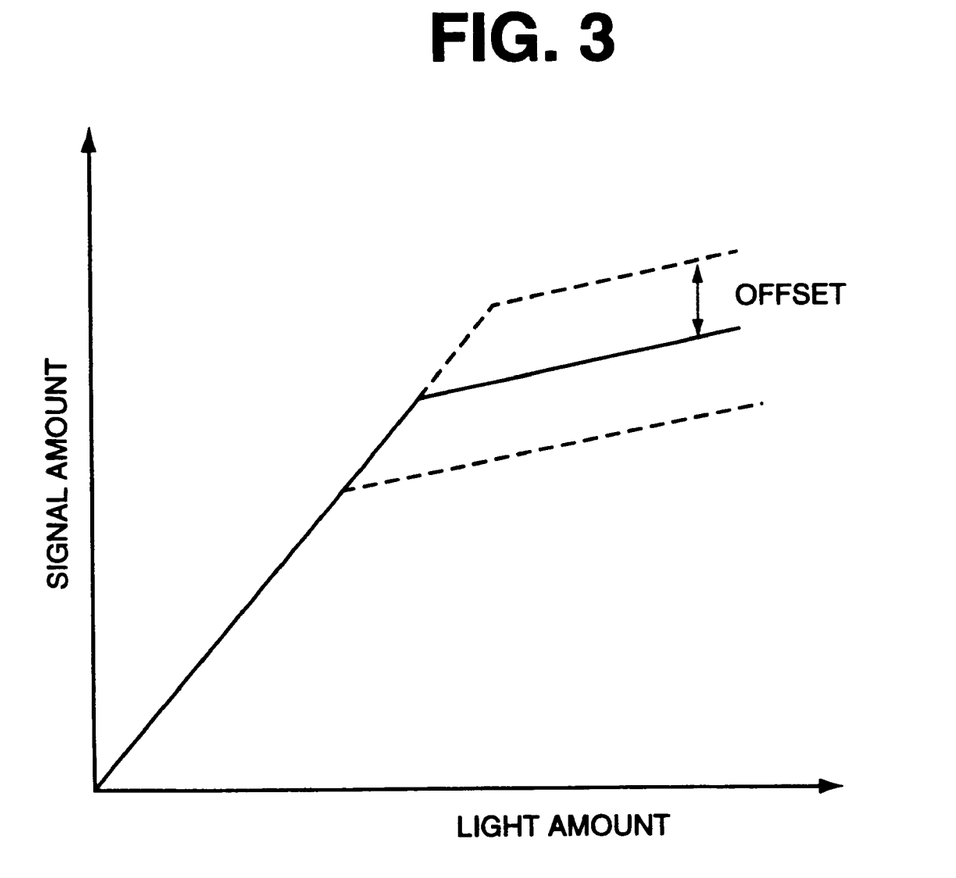
FIG. 3 represents an input/output characteristic diagram when an offset occurs.

However, in the conventional CCD solid-state imaging device with the above-described structure, i.e., the limiters are operated for the respective light receiving portions in the high-sensitive light receiving portion 101, the overflow characteristics are fluctuated in the respective light receiving portions, and since the fluctuations in the saturated charge amounts "Qs" of the respective light receiving portions become large, offsets are produced in the input/output characteristic approximated to the folded line, as shown in FIG. 3. As a result, when a large light amount is entered under which the high-sensitive light receiving portion 101 becomes saturated, there are large fluctuations in the saturated charge amounts "Qs" of the respective light receiving portions. Thus, there is a problem that fixed pattern noise is produced in the images (namely, fluctuation of fixed patterns).

SUMMARY OF THE INVENTION

Therefore, the present invention has an object to provide a solid-state imaging device capable of enlarging a dynamic range without producing fixed pattern noise caused by fluctuations in saturated charge amounts "Qs" of the respective light receiving portions.

A solid-state imaging apparatus, according to the present invention, is arranged by comprising an imaging portion for obtaining more than two sorts of signal charges with different sensitivities; a charge transferring portion for transferring the signal charges having the different sensitivities transferred from this imaging portion as point sequential signals; a bias applying circuit for applying a DC bias voltage to an output gate of the charge transferring portion, said DC bias voltage being used to clip at least signal charges other than a signal charge having a minimum sensitivity in a preselected clip level; and a charge detecting portion for mixing the signal charge clipped by the output gate with the signal charges having other sensitivities to be converted into an electric signal.

In the solid-state imaging device with the above-described arrangement, when more than two sorts of signal charges having the different sensitivities are transferred from the imaging portion to the charge transferring portion, the charge transferring portion transfers these signal charges having the different sensitivities in such a manner that these signal charges become point sequential signals. In this charge transfer portion, since the DC bias voltage corresponding to a predetermined clip level is applied to this output gate, when a large amount of light is entered, the signal charge having the high sensitivity exceeds this clip level to be therefore clipped. Thereafter, the clipped signal charge is supplied to the charge detecting portion. The charge detecting portion mixes this clipped signal charge with the signal charges with other sensitivities to convert the mixed signal charges into an electric signal.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Figure 4:
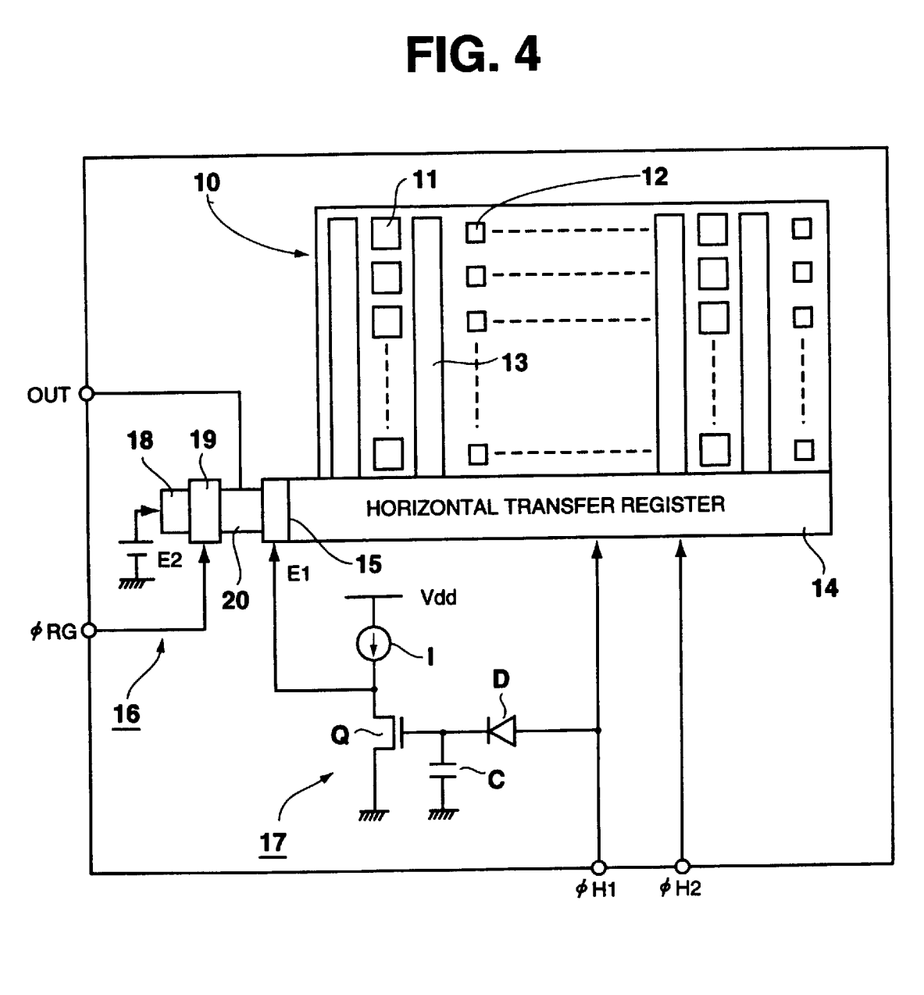
FIG. 4 schematically indicates a structure of a solid-state imaging device according to an embodiment of the present invention.

Referring now to drawings, solid-state imaging devices according to various embodiments of the present invention will be described. FIG. 4 schematically indicates a structural diagram of a solid-state imaging device according to an embodiment of the present invention.

As shown in FIG. 4, in an imaging portion 10, for instance, two sorts of light receiving portions (pixels) having different sensitivities, namely a high-sensitive light receiving portion 11 and a low-sensitive light receiving portion 12 are alternately arranged in a stripe shape in unit of column along the horizontal direction (namely, right/left direction as viewed in FIG. 4). It should be noted in this embodiment, the following methods may be conceived as a method for differing sensitivities of the light receiving portions 11 and 12. That is, 1). opening areas of the light receiving portions 11 and 12 are made different; 2). a magnification of an on-chip lens is made different; 3). filters having different transmissivities from each other are attached on the respective light receiving portions 11 and 12; and 4). storage time of signal charges is different from each other. It should be noted that the high-sensitive light receiving portion 11 is schematically shown by a large area symbol of "□", whereas the low-sensitive light receiving portion 12 is schematically indicated by a small area symbol of "□".

Both the high-sensitive light receiving portion 11 and the low-sensitive light receiving portion 12 are arranged by, for example, photodiodes, and photoelectrically converts incident light, and also stores signal charges having a charge amount corresponding to a light amount of this photoelectrically converted incident light. A vertical transfer register 13 is arranged with respect to each of vertical columns of the high-sensitive light receiving portion 11 and the low-sensitive light receiving portion 12. The vertical transfer register 13 is constructed of packet groups capable of independently transferring signal charges of the respective light receiving portions. As a result, it is possible to achieve a so-called "all pixel reading operation" such that the signal charges of all of the light receiving portions are independently read, and are transferred without being mixed in the vertical transfer register 13.

A horizontal transfer register 14 is arranged in a lower side of the imaging portion 10, as viewed in this drawing. This horizontal transfer register 14 is driven by, for instance, two phased horizontal transfer pulses "φH1" and "φH2", and horizontally and sequentially transfers the signal charges in unit of a pixel which have been moved in unit of a line from the imaging portion 10. The signal charges transferred by this horizontal transfer register 14 are supplied via an output gate 15 to a charge detecting unit 16 in unit of the pixel. A DC bias voltage E1 produced in a bias applying circuit 17 is applied to the output gate 15.

In response to the horizontal transfer pulse φH1 (otherwise, φH2), the DC bias voltage E1 is produced by this bias applying circuit 17. As one example, this bias applying circuit 17 is arranged by a rectifier circuit constructed of a diode D having an anode to which the horizontal transfer pulse φH1 is applied, a capacitor C connected between a cathode of this diode D and the ground, a P-channel MOS transistor Q whose gate is connected to the cathode of the diode D and whose drain is grounded, and a current source I connected between a source of this MOS transistor and a power source Vdd.

In this bias applying circuit 17, the horizontal transfer pulse φH1 is rectified by the diode D, and then the capacitor C is charged by this rectified output. The charged voltage of this capacitor C becomes substantially equal to the high-level potential of the horizontal transfer pulse φH1. Assuming now that the high-level potential of the horizontal transfer pulse φH1 is 5V, and the threshold voltage of the P-channel MOS transistor Q is Vth, a voltage of approximately (5V+Vth) is conducted as a source voltage of this MOS transistor Q. Then, the source voltage of this MOS transistor Q is applied as the DC bias voltage E1 to the output gate 15 of the horizontal transfer register 14.

The charge detecting portion 16 is constituted by, for example, a floating diffusion amplifier. In this voltage detecting portion 16, a preselected DC voltage E2 is applied to a reset drain 18, and a reset gate pulse φRG is applied to a reset gate 19. Then, the signal charge supplied from the horizontal transfer register 14 is converted into a signal voltage by a floating diffusion capacitance 20, which is derived as a signal output OUT. In this case, the frequency of the reset gate pulse φRG, namely the reset frequency of the charge detecting unit 16 is set to be a half of the frequencies of the horizontal transfer pulses φH1 and φH2, namely a ½ drive frequency of the horizontal transfer register 14.

Next, a description will now be made of a signal charge reading operation and a signal charge transferring operation in the all pixel reading type CCD solid-state imaging device with employment of the above-described circuit arrangement.

In this imaging portion 10, the signal charges obtained by being photo-converted by the high-sensitive light receiving unit 11 and the low-sensitive light receiving unit 12 are read out to the vertical transfer register 13. The signal charges are sequentially transferred from this vertical transfer register 13 to the horizontal transfer register 14 in unit of the pixel every column. At this time, the signal charge of the high-sensitive light receiving portion 11 and the signal charge of the low-sensitive light receiving portion 12 are alternately arranged in the horizontal transfer register 14. As a consequence, the respective signal charges of the high-sensitive light receiving portion 11 and the low-sensitive light receiving portion 12 are transferred as point sequential signals to the output side by operating the horizontal transfer register 14.

Figure 5:
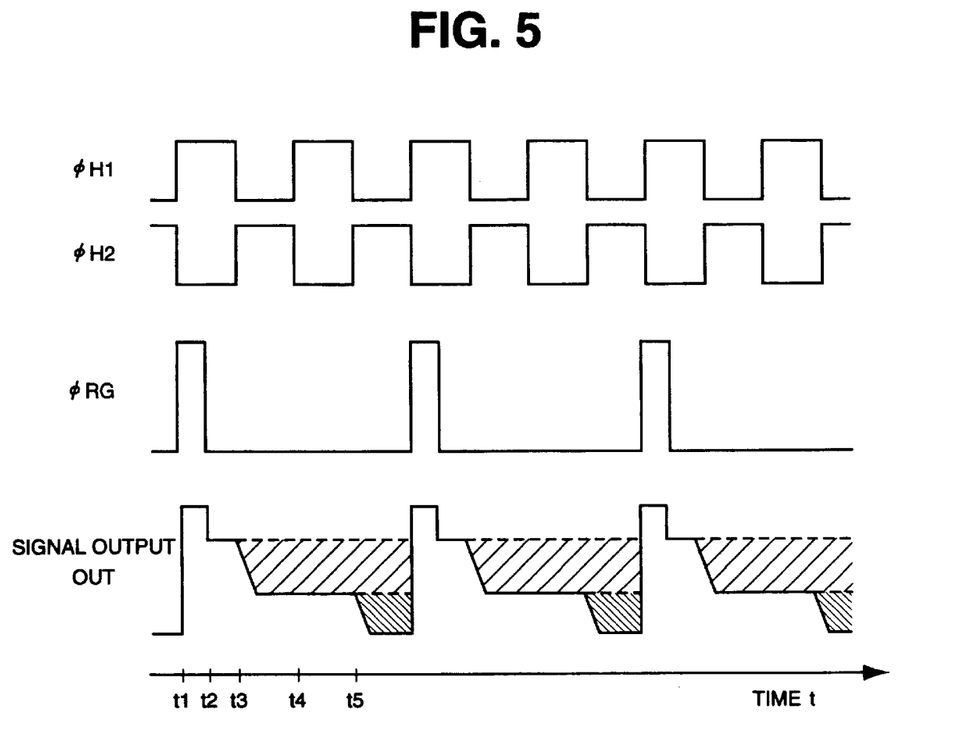
FIG. 5 is a timing chart for explaining a clipping process operation of signal charges and a mixing process operation of the signal charges.
Figure 6:
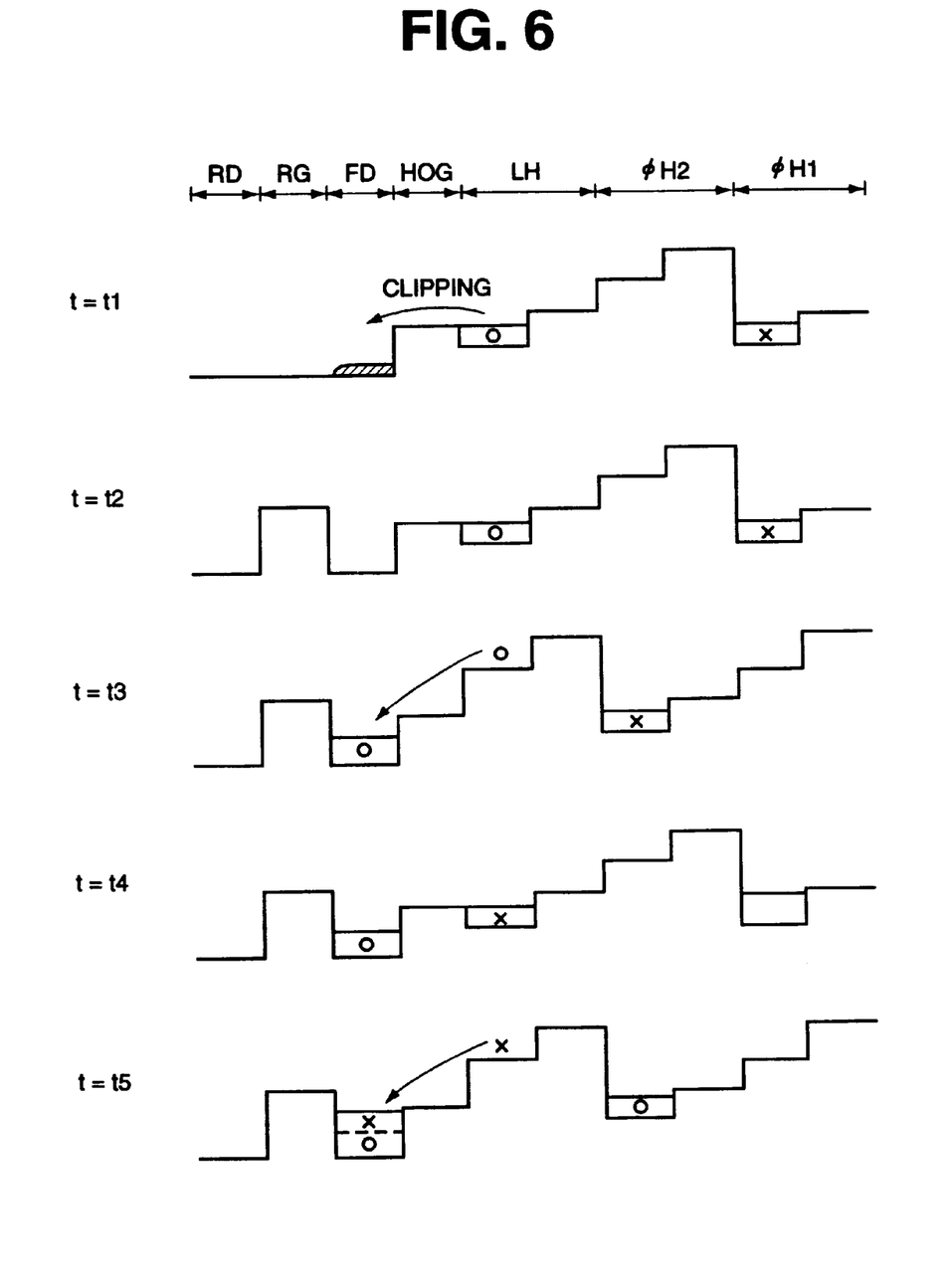
FIG. 6 illustrates a potential diagram for representing potential distributions of the various portions when the signal charges are clipping-processed and mixing-processed.

Subsequently, referring now to a timing chart of FIG. 5 and a potential diagram of FIG. 6, a description will now be made of a clipping process operation and a mixing process operation. The clipping process operation is carried out with respect to the signal charges of the high-sensitive light receiving portion 11 at the output gate 15 of the horizontal transfer register 14 while a large amount of light is entered. The mixing process operation is carried out with respect to the signal charges of the high-sensitive light receiving portion 11 and also the signal charges of the low-sensitive light receiving portion 12 in the charge detecting portion 16. It should be understood that the signal charge of the high-sensitive light receiving portion 11 is schematically represented by symbol "o" and the signal charge of the low-sensitive light receiving portion 12 is schematically indicated by symbol "x" in these drawing.

In the horizontal transfer register 14, both the signal charges "o" of the high-sensitive light receiving portion 11 and the signal charges "x" of the low-sensitive light receiving portion 12 are sequentially transferred in the point sequential manner by driving the horizontal transfer register 14 in response to the horizontal transfer pulses φH1 and φH2. In the case that the signal charges "o" of the high-sensitive light receiving portion 11 are transferred to the final transfer stage (LH), namely when the horizontal transfer pulse φH1 is transited to a high level and the horizontal transfer pulse φH2 is transited to a low level (t=t1), if the charge amount of this signal charge "o" corresponds to the large light amount, and therefore exceeds a lower potential of the output gate (HOG) 15, then this exceeding signal charge may flow into the floating diffusion capacitance (FD) 20 of the charge detecting portion 16.

As a result, the clipping process operation is performed with respect to the signal charges "o" of the high-sensitive light receiving portion 11 of the output gate 15 during a large amount of light. In this case, the clipping level at the output gate 15, namely, the lower potential of the output gate (HOG) 15 may be determined by the DC bias voltage E1 applied to the output gate 15, and the impurity concentration under the output gate 15.

While this clipping process operation is carried out, a reset gate pulse φRG applied to the reset gate (RG) 19 is in a high level (for example, approximately 15V), and the potential under the reset gate 19 is brought into a deep state. As a consequence, the signal charges which have exceeded the clip level and then have flown into the floating diffusion capacitance 20 are swept out via the reset gate 19 to the reset drain (RD) 18.

Next, the reset gate pulse φRG is transited to a low level (t=t2). Accordingly, the potential under the reset gate 19 is brought into a shallow state. subsequently, when the horizontal transfer pulse φH1 is moved to a low level and the horizontal transfer pulse φH2 is moved to a high level (t=t3), the potential under the final transfer stage (LH) of the horizontal transfer register 14 is brought into a shallow state. Thus, the signal charges "o" of the high-sensitive light receiving portion 11 which have been stored under the final transfer stage (LH) during the clipping process operation are transferred via the output gate 15 to the floating diffusion capacitance 20 of the charge detecting portion 16.

Next, when the low level of the horizontal transfer pulse φH1 is transited to a high level and the high level of the horizontal transfer pulse φH2 is transited to a low level (t=t4), the signal charges "x" of the low-sensitive light receiving portion 12 are transferred to the final transfer stage (LH) of the horizontal transfer register 14. Thus, the signal charges of the low-sensitive light receiving portion 12 are directly stored under the final transfer stage (LH).

At this time, since the frequency of the reset gate pulse φRG is set to the ½ frequency of either the horizontal transfer pulse φH1 or the horizontal transfer pulse φH2, the resetting operation of the floating diffusion capacitance 20 of the charge detecting portion 16 is thinned one time. As a consequence, the signal charges "o" of the high level light receiving portion 11 which have been previously transferred to the floating diffusion capacitance 20 are not reset, but are directly brought into the storage state in the floating diffusion capacitance 20.

Subsequently, when the horizontal transfer pulse φH1 is transited to a low level and the horizontal transfer pulse φH2 is transited to a high level (t=t5), the potential under the final transfer stage (LH) of the horizontal transfer register 14 is brought into a shallow state, the signal charges "x" of the low-sensitive light receiving portion 12 are transferred via the output gate 15 to the floating diffusion capacitance 20 of the charge detecting portion 16 so as to be mixed with the signal charges "o" of the high-sensitive light receiving portion 11 which have been so far stored in the floating diffusion capacitance 20. Thus, the mixed signal charges are converted into a signal voltage, and then this signal voltage is derived as the signal output "OUT".

Subsequently, a series of the above-described clipping/mixing process operations are repeatedly executed. As previously explained, after both the signal charges "o" of the high-sensitive light receiving portion 11 and the signal charges "x" of the low-sensitive light receiving portion 12 are transferred to the horizontal transfer register 14 so as to become the point sequential signals, the signal charges "o" of the high-sensitive light receiving portion 11 produced during the large amount of the incident light are clipping-processed at the output gate 15. Thereafter, the signal charges "o" of the high-sensitive light receiving portion 11 are mixed with the signal charges "x" of the low-sensitive light receiving portion 12 by the floating diffusion capacitance 20 of the charge detecting portion 16. As a result, since the signal charges "o" of the high-sensitive light receiving portion 11 are clipping-processed in the clipping level commonly used to the respective pixels, it is possible to suppress such a problem that fluctuations of the fixed pattern occur in the resultant images, which are caused by fluctuations in the characteristics between the light receiving portions (pixels).

In particular, the solid-state imaging device of this embodiment is arranged by that the clipping process operation is carried out in the output gate 15, and also the mixing process operation is performed in the charge detecting portion 16. As a consequence, the DC bias voltage E1 applied to the output gate 15 is properly set, and also the frequency of the reset gate pulse iRG is merely set to the ½ frequency of the horizontal transfer pulses φH1 or φH2. Although such a small change is required, there are great advantages that the incident light can be read out in the wide dynamic range with directly employing the basic structure of the conventional progressive scan type CCD solid-state imaging device.

Also, since the DC bias voltage E1 to be applied to the output gate 15 is produced based on the horizontal transfer pulses φH1 and φH2, it is possible to realize the non-adjustment control of the DC bias voltage E1. In other words, in the case of CCD solid-state imaging devices, since voltages to be applied to output gates are different from the respective CCD solid-state imaging devices, the levels of the externally applied DC bias voltages E1 must be adjusted with respect to each of these CCD devices. Since the bias applying circuit 17 is built in the CCD solid-state imaging device according to the embodiment, there is no need to adjust the DC bias voltages E1 of the respective devices, so that the external bias voltage adjusting circuit is no longer required.

On the other hand, in such a case that the DC bias voltage E1 is fixed, when the levels of the horizontal transfer pulses φH1 and φH2 are varied, the potential difference between the horizontal transfer register 14 and the output gate 15 is varied, which may give adverse influences to the transfer operations of the signal charges. To the contrary, according to this embodiment, since the DC bias voltage E1 is produced based on the horizontal transfer pulses φH1 or φH2, when the levels of the horizontal transfer pulses φH1 and φH2 are varied, the level of the DC bias voltage E1 is also varied with following the level variations of the horizontal transfer pulses φH1 and φH2. Accordingly, since the potential difference between the horizontal transfer register 14 and the output gate 15 can be continuously maintained at a constant value, the clipping process operation and the mixing process operation can be carried out without deteriorating the transfer operations of the signal charges.

It should be noted that although the two sorts of light receiving portions having the different sensitivities are arranged in the longitudinal stripe shape in accordance with the above-explained embodiment, the present invention is not limited thereto, but may be modified. For instance, any other arrangements may be employed if the signal charges "o" of the high-sensitive light receiving portion 11 and the signal charges "x" of the low-sensitive light receiving portion 12 become the point sequential signals at such a stage that these signal charges have been transferred to the horizontal transfer register 14. As a consequence, other modified structural examples are, as shown in FIG. 7, a CCD solid-state imaging device in which a high-sensitive light receiving portion 11 and a low-sensitive light receiving portion 12 are arranged in a checkered pattern, and another CCD solid-state imaging device (see FIG. 8) in which a high-sensitive light receiving portion 11 and a low-sensitive light receiving portion 12 are arranged in a lateral stripe shape.

Figure 7:
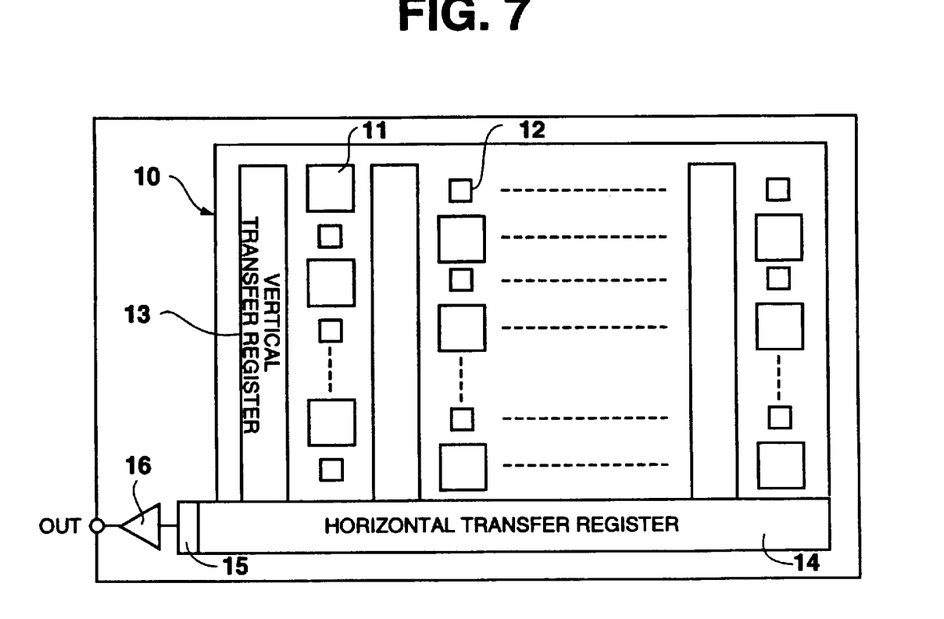
FIG. 7 is a structural diagram for schematically showing a checkered pattern of a high-sensitive light receiving portion a low-sensitive light receiving portion.

In the case of the checkered pattern arrangement shown in FIG. 7, the respective signal charges of the high-sensitive light receiving portion 11 and the low-sensitive light receiving portion 12, which have been read out in the vertical transfer register 13, are directly transferred to the horizontal transfer register 14 in unit of a single line (1 line) in a sequential order. As a consequence, the signal charge of the high-sensitive light receiving portion 11 and the signal charge of the low-sensitive light receiving portion 12 are alternately arranged in the horizontal transfer register 14, and then constitute point sequential signals.

Figure 8:
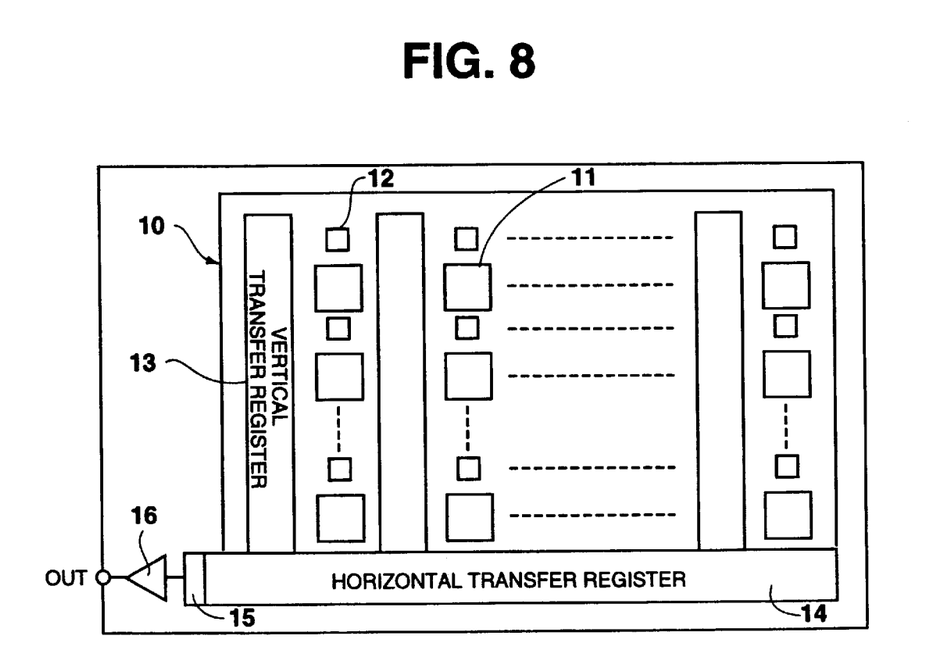
FIG. 8 is a structural diagram for schematically indicating a lateral stripe arrangement of the high-sensitive light receiving portion and the low-sensitive light receiving portion.

On the other hand, in the case of the lateral stripe arrangement shown in FIG. 8, the respective signal charges of the high-sensitive light receiving portion 11 and of the low-sensitive light receiving portion 12, which have been read out to the vertical transfer register 13, are firstly transferred to the horizontal transfer register 14 only by 1 line. Thereafter, this horizontal transfer register 14 is shifted only by 1 bit. Subsequently, the signal charges for the subsequent 1 line are transferred to the horizontal transfer register 14, so that the point sequential signal may be produced. In this case, the pitch of the horizontal transfer register 14 becomes two times larger than the pitch of the vertical transfer register 13.

The above-mentioned embodiment has described such a structure that since the sensitivities of the respective light receiving portions are different from each other, the signal charges with the different sensitivities are obtained in unit of the pixel. Alternatively, even when the storage time of the signal charges in a single light receiving portion is changed, signal charges having different sensitivities may be obtained. Therefore, the present invention may be applied also to such a modified CCD solid-state imaging device.

Furthermore, although there are provided the two sorts of light receiving portions having the different sensitivities as the high-sensitive light receiving portion 11 and the low-sensitive light receiving portion 12 in the above-described embodiment, the present invention is not limited thereto. For instance, when the sensitivities are set to more than three different sorts, after the signal charges of the respective light receiving portions have been transferred to the horizontal transfer register 14, at least the signal charges of the light receiving portions other than the light receiving portion with the minimum sensitivity may be clipping-processed. Thereafter, the signal charges of the light receiving portions with the respective sensitivities may be mixed with each other.

As previously explained in detail, in accordance with the present invention, in the wide dynamic range readout type solid-state imaging device capable of producing more than two sorts of signal charges having the different sensitivities, the signal charges having the different sensitivities, which have been transferred from the imaging portion, are transferred so as to constitute the point sequential signals. At least, the signal charges other than the signal charge with the minimum sensitivity are clipping-processed at the output gate. Thereafter, the clipped signal charges are mixed with the signal charges having the sensitivities other than the minimum sensitivity in the charge detecting portion. Accordingly, in such a large light amount case that the high-sensitive light receiving portion becomes saturated, since the respective signal charges which will be saturated are clipping-processed in the common clip level, the fixed pattern noise is not produced which is caused by the fluctuations in the saturated charge amounts Qs of the respective light receiving portions, but the dynamic range can be extended.

What is claimed is:

1. A solid-state imaging device comprising:

an imaging portion for photoelectrically converting incident light to thereby produce a signal charge of a high sensitivity and a signal charge of a low sensitivity lower than said high sensitivity, said imaging portion having at least one vertical transfer register for transferring said signal charges;

a horizontal transfer register arranged adjacent to said imaging portion, for receiving signal charges from said at least one vertical transfer register and for independently transferring said high sensitivity and low sensitivity signal charges to an output gate at a terminal portion thereof, which clips said signal charge of said high sensitivity;

a charge detecting portion arranged adjacent to said output gate, for detecting said signal charges transferred from said output gate; and a bias applying circuit for applying a bias voltage to said output gate so as to set a clip level for clipping said signal charge of said high sensitivity.

2. A solid-state imaging device as claimed in claim 1 wherein:

said charge detecting portion includes a floating diffusion, a reset gate, and a reset drain.

3. A solid-state imaging device as claimed in claim 1 wherein:

both said signal charge of said high sensitivity and said signal charge of said low sensitivity are transferred in said horizontal register in a point sequential manner.

4. A solid-state imaging device as claimed in claim 1 wherein:

said bias voltage is produced from a voltage for driving said horizontal transfer register.

5. A solid-state imaging device as claimed in claim 4 wherein:

said bias applying circuit includes:
a diode whose anode is connected to a horizontal transfer pulse used to drive said horizontal transfer register;
a capacitor connected between a cathode of said diode and a reference potential;
a transistor whose gate is connected to said cathode of said diode and whose drain is connected to said reference potential; and
a current source connected between a source of said transistor and a power supply.

6. A solid-state imaging device as claimed in claim 1 further comprising:

adding means for adding said signal charge of said high sensitivity to said signal charge of said low sensitivity in said charge detecting portion.

7. A solid-state imaging device comprising:

an imaging portion for photoelectrically converting incident light to thereby produce "n" sorts (symbol "n" being an integer larger than, or equal to 2) of signal charges having different sensitivities, said imaging portion having at least one vertical transfer register for transferring said signal charges;

a horizontal transfer register arranged adjacent to said imaging portion, for receiving signal charges from said at least one vertical transfer register and for independently transferring said signal charges to an output gate for clipping said signal charge of the highest sensitivity at a terminal portion thereof, for transferring said "n" sorts of signal charges having said different sensitivities in a point sequential manner;

a charge detecting portion arranged adjacent to said output gate, for detecting said signal charges transferred from said output gate;

a bias applying circuit for applying a bias voltage to said output gate so as to set a clip level for clipping said signal charge of said high sensitivity; and adding means for adding said signal charge of said high sensitivity to said signal charge of said low sensitivity in said charge detecting portion.

8. A solid-state imaging device as claimed in claim 7 wherein:

said charge detecting portion is constructed of a floating diffusion amplifier, and said floating diffusion amplifier includes a floating diffusion, a reset gate, and a reset drain.

9. A solid-state imaging device as claimed in claim 8 wherein:

a reset frequency of said floating diffusion amplifier is set to a 1/n transfer frequency of said horizontal transfer register.

10. A solid-state imaging device as claimed in claim 9 wherein:

said reset drain absorbs a signal charge which is clipped at said clip level and exceeds said output gate.

11. A solid-state imaging device as claimed in claim 7 wherein:

said bias voltage is produced from a voltage used to drive said horizontal transfer register.

12. A solid-state imaging device as claimed in claim 11 wherein:

said bias applying circuit includes:
a diode whose anode is connected to a horizontal transfer pulse used to drive said horizontal transfer register;
a capacitor connected between a cathode of said diode and a reference potential;
a transistor whose gate is connected to said cathode of said diode and whose drain is connected to said reference potential; and
a current source connected between a source of said transistor and a power supply.

13. A solid-state imaging device comprising:

an imaging portion for photoelectrically converting incident light to thereby produce a signal charge of a high sensitivity and a signal charge of a low sensitivity lower than said high sensitivity, said imaging portion having at least one vertical transfer register for transferring said signal charges;

a horizontal transfer register arranged adjacent to said imaging portion, for receiving signal charges from said at least one vertical transfer register and for independently transferring said high sensitivity and low sensitivity signal charges to an output gate at a terminal portion thereof, which clips said signal charge of said high sensitivity;

a charge detecting portion arranged adjacent to said output gate, for detecting said signal charges transferred from said output gate; and a bias applying circuit for applying a bias voltage used to drive said horizontal transfer register to said output gate so as to set a clip level for clipping said signal charge of said high sensitivity.

14. A solid-state imaging device as claimed in claim 13 wherein:

said charge detecting portion includes a floating diffusion, a reset gate, and a reset drain.

15. A solid-state imaging device as claimed in claim 13 wherein:

both said signal charge of the high sensitivity and said signal charge of the low sensitivity are transferred in said horizontal register in a point sequential manner.

16. A solid-state imaging device as claimed in claim 13 wherein:

said bias applying circuit includes:
a diode whose anode is connected to a horizontal transfer pulse used to drive said horizontal transfer register;
a capacitor connected between a cathode of said diode and a reference potential;
a transistor whose gate is connected to said cathode of said diode and whose source is connected to said reference potential; and whose drain is grounded;
a current source connected between a source of said transistor and a power supply.

17. A solid-state imaging device as claimed in claim 13 further comprising:

adding means for adding said signal charge of the high sensitivity to said signal charge of the low sensitivity in said charge detecting portion.

18. A method for solid-state imaging comprising the steps of:

photoelectrically converting incident light to produce a signal charge of a high sensitivity;

photoelectrically converting incident light to produce a signal charge of a low sensitivity lower than said high sensitivity;

transferring said high sensitivity and low sensitivity signal charges along a vertical transfer register to a horizontal transfer register;

independently transferring said high sensitivity and low sensitivity signal charges from said vertical transfer register to an output gate terminal along said horizontal transfer register;

clipping said high sensitivity signal charges at said output gate terminal;

detecting said signal charges transferred from said output gate; and applying a bias voltage to said output gate so as to set a clip level for clipping said high sensitivity signal charge.

19. The method for solid-state imaging according to claim 18, wherein a portion of said incident light which produces said high sensitivity signal charge is the same as a portion of said incident light which produces said low sensitivity signal charge.

* * * * *